United States Patent
Terborg

(10) Patent No.: US 11,579,100 B2
(45) Date of Patent: Feb. 14, 2023

(54) METHOD FOR DETERMINING A MATERIAL COMPOSITION

(71) Applicant: BRUKER NANO GMBH, Berlin (DE)

(72) Inventor: Ralf Terborg, Berlin (DE)

(73) Assignee: BRUKER NANO GMBH, Berlin (DE)

( * ) Notice: Subject to any disclaimer, the term of this patent is extended or adjusted under 35 U.S.C. 154(b) by 55 days.

(21) Appl. No.: 17/095,336

(22) Filed: Nov. 11, 2020

(65) Prior Publication Data
US 2021/0148842 A1    May 20, 2021

(30) Foreign Application Priority Data

Nov. 20, 2019 (EP) .................................... 19210237

(51) Int. Cl.
  *G01N 23/2252* (2018.01)
  *G01J 3/443* (2006.01)
  *G01B 15/02* (2006.01)

(52) U.S. Cl.
  CPC ....... *G01N 23/2252* (2013.01); *G01B 15/025* (2013.01); *G01J 3/443* (2013.01); *G01N 2223/041* (2013.01); *G01N 2223/076* (2013.01); *G01N 2223/079* (2013.01)

(58) Field of Classification Search
  CPC ......... G01N 23/2252; G01N 2223/076; G01N 2223/079; G01N 2223/61; G01N 2223/041; G01J 3/443; G01B 15/025
  USPC ......................................... 250/307, 306, 310
  See application file for complete search history.

(56) References Cited

U.S. PATENT DOCUMENTS

| | | | | |
|---|---|---|---|---|
| 4,577,338 A | * | 3/1986 | Takahashi | G01N 23/223 378/207 |
| 5,210,414 A | * | 5/1993 | Wallace | G01N 1/2202 250/307 |
| 9,702,835 B1 | | 7/2017 | Campbell et al. | |
| 2003/0118148 A1 | | 6/2003 | Kataoka et al. | |
| 2006/0291619 A1 | * | 12/2006 | Statham | G01N 23/22 378/45 |

(Continued)

FOREIGN PATENT DOCUMENTS

WO  2007/132243 A1  11/2007

OTHER PUBLICATIONS

Extended Search Report dated May 27, 2020, in connection with European Application No. 19210237.4.

(Continued)

*Primary Examiner* — Kiet T Nguyen
(74) *Attorney, Agent, or Firm* — Norris McLaughlin, P.A.

(57) ABSTRACT

A method comprises the steps of: (a) Obtaining a measured X-ray spectrum for the coated sample, for determining characteristics for the sample and for a coating material; (b) Determining a simulated X-ray spectrum for the sample based on an initial sample composition; (c) Determining an adapted sample composition that improves a match between the characteristics of the sample and an adapted simulated X ray spectrum; (d) Determining an adapted coating thickness for the coating material based on the adapted sample composition and characteristics of the coating; and (e) Repeating the steps (b) to (d) using the adapted sample composition and the adapted coating thickness of the coating material instead of the initial values, wherein the coating thickness is used for determining an absorption of X-rays.

14 Claims, 2 Drawing Sheets

(56) References Cited

U.S. PATENT DOCUMENTS

2017/0336334 A1\* 11/2017 Yun .................... G01N 23/2076

OTHER PUBLICATIONS

Pouchou J-L, Pichoir F: "Quantitative Analysis of Homogeneous or Stratified Microvolumes Applying the Model "PAP"",Electron Probe Quantitation, 1991, pp. 31-75, XP009079898.
European Office Action dated Dec. 1, 2022, in connection with European Application No. 19210237.4.

\* cited by examiner

METHOD FOR DETERMINING A MATERIAL COMPOSITION

This application claims foreign priority benefit under 35 U.S.C. § 119 of European Patent Application No. 19210237.4, filed Nov. 20, 2019, the disclosure of which is incorporated herein by reference.

FIELD OF THE INVENTION

The present invention relates to a method for determining a material composition, particularly to a method of quantitative X-ray spectrometry using energy dispersive X-ray analysis with an improved correction for coating materials in order to improve the accuracy of the analysis. The invention is further directed to an X-ray system and a computer program configured for performing the method as well as to a computer-readable data carrier with the program.

Technological Background

Energy-dispersive X-ray spectroscopy, EDX, and wavelength-dispersive X-ray spectroscopy, WDX, are commonly used methods for determining the material composition of a target using X-ray spectroscopy. In both methods, the target is illuminated with a high-energy beam of charged particles such as an electron beam, e.g., in an electron microscope, and the X-rays emitted by the sample are detected with an X-ray detector. Particularly, in EDX the amount and energy of the emitted X-rays are resolved by an energy-dispersive spectrometer and the resulting EDX spectrum can be used to determine the elemental composition of the target. In WDX, the emitted X-rays are further diffracted by a crystal of known lattice to precisely identify the distribution of X-rays with a specific wavelength, thus allowing to identify the phases including the spatial orientation of the crystal lattices of the target's constituents.

As the used high energy beam would lead to a local charging of an insulating target, the samples are usually coated with a conductive coating prior to quantitative X-ray analysis. Usually a thin carbon coating with a thickness between 5 and 30 nm is applied, absorbing only a little fraction of the incident radiation due to the low atomic number of the carbon. However, coatings from other materials, such as gold or aluminum, are also used in the field.

It is further known that the coating has an influence on the results of quantitative analysis, based on the attenuation of the incident beam as well as of the emitted X-ray in the coating as well as by producing own characteristic peaks in the obtained spectra. Hence, if the coating thickness and material is known, it is usually considered in the quantitative analysis or at least an assumed coating thickness and material is assumed for the quantification. However, such assumptions might be erroneous and might lead to unsatisfactory results as the usually applied coating techniques do not provide highly uniform coating thicknesses.

Hence, some tools for applying the coating to the target samples have specialized sensors for determining the coating thickness. However, as e.g., shown by Matthews et al. in "The Accuracy of Al and Cu Film Thickness Determinations and the Implications for Electron Probe Microanalysis", 2018, even then the errors in coating thickness determination can be severe. So produced collocated film thickness monitor, FTM, sensors, errors in film thickness determination of about 10-20%. These did propagate to errors of about 70% in the final composition quantification, rendering the results of such material composition meaningless.

And even if the coating thickness could be initially determined with high precision, the thickness might change during the measurement. As also shown by Matthews et al. in "Electron Beam-Induced Carbon Erosion and the Impact on Electron Probe Microanalysis", 2018, the electron beam-induced carbon contamination is a balance between simultaneous deposition and erosion processes. Therein, the erosion rate of a carbon coating was found to depend on a variety of factors such as e.g., electron flux density and accelerating voltage. Hence, the variations of coating thickness are itself hard to predict.

It is thus an object of the present invention to provide a method for determining material composition of a target using quantitative X-ray spectroscopy, wherein the method accounts for the coating thickness and coating composition of the target in an improved manner.

DESCRIPTION OF THE INVENTION

According to an aspect of the present disclosure, the objective is solved by a method for determining a sample composition, particularly the sample composition of a coated sample. In a step (a) of the method of the invention, a measured X-ray spectrum is obtained for the coated sample. The measured X-ray spectrum is obtained from at least one measurement point of the sample using a measurement system. In other words, the sample is exited within the measurement system for X-ray fluorescence and then a signal emitted by the sample is detected by a detector of the measurement system. Preferably, such X-ray spectra are obtained from a plurality of measurement points of the sample. Preferably, the measurement system comprises an electron microscope that is configured for performing energy dispersive X-ray spectroscopy, EDX, or wavelength-dispersive X-ray spectroscopy, WDS, and comprises at least an electron beam source, an X-ray detector and a control unit.

An X-ray sample measured from the coated sample comprises a plurality of first lines that are characteristic for the sample. These first lines are also called characteristic lines and may comprise the K-lines (K$\alpha$, K$\beta$, K . . . ) of the uncoated sample material. These first lines thus carry the information on the sample composition that shall be determined in the method. An X-ray sample measured from the coated sample further comprises at least one second line that is characteristic for a coating material. This at least one second line may thus comprise the K-lines (K$\alpha$, K$\beta$, K . . . ) of the coating material that shall be considered in the method.

In a next step (b) of the method, a simulated X-ray spectrum for the sample is determined based on an initial sample composition. Therein, the initial sample composition may be set by a user input based on a priori knowledge on the sample or may be set based on a pre-scan as set forth in more detail below. The initial sample composition therein preferably refers to the composition of a bulk sample without the coating on the sample. Simulation of X-ray spectra starting from assumed sample compositions is known to the person skilled in the art. An exemplary method for simulating X-ray spectra is disclosed in the publication of Pouchou, "Standardless X-ray Analysis of Bulk Specimens", Mikrochim. Acta 114/115,33-52 (1994). Therein, particularly equation (3) disclosed in this publication can be used to implement a simulation of X-ray spectra based on an initial sample composition. Programmed code for performing such simulation of X-ray spectra already exists and is not the gist of the method. In the context of the present disclosure it is essential that the simulated X-ray spectrum is first based on an initial guess for the bulk sample composition without the coating material.

In another step (c) of the method, an adapted sample composition is determined that improves a match between the plurality of first lines of the measured X-ray spectrum and an adapted simulated X-ray spectrum. In other words, a comparison is performed between the first lines of the measured X-ray spectrum and simulated X-ray spectrum. Then, the sample composition underlying the simulated X-ray spectrum is adapted in order to simulate an adapted X-ray spectrum. After adapting the simulated spectra, again a comparison is performed with the first lines of the measured spectrum. An adapted sample composition determined in this step is such that it improves a match between the adapted simulated X-ray spectrum and the measured X-ray spectrum, e.g. minimizes a difference (least mean square).

Based on the so determined adapted sample composition leading to the adapted simulated X-ray spectrum, in another step (d) of the method an adapted coating thickness is determined. The coating thickness is therein determined based on the adapted simulated X-ray spectrum and the at least second line in the measured X-ray spectrum, particularly the position and height (amplitude) of the at least one second line. In other words, a coating thickness is determined based on the assumption that the coating material is deposited on a sample corresponding to the adapted sample composition and produced the at least one second line. The determination of the adapted coating thickness is set forth in detail below.

In the method of the present invention, the steps (b) to (d) described above are then repeated using the adapted sample composition and the adapted coating thickness of the coating material instead of the initial values. Hence, in a next round of iteration, a simulated X-ray spectrum for the sample is determined based on an adapted sample composition and, eventually, based on the adapted coating thickness. Therein, the coating thickness is utilized for determining absorption of X-rays as described in more detail below. Further, in this next round of iteration, an adaption of the simulated X-ray spectrum is again performed with respect to the measured X-ray spectrum. In case the simulated X-ray spectrum is not determined under consideration of X-ray absorption due to the adapted coating thickness, the adapted coating thickness might be utilized for scaling the measured X-ray spectrum in order to account for the absorption of X-rays in the coating material, as explained in detail below. Once, an adapted sample composition is again determined in this next round of iteration, a further adapted coating thickness is determined in this round of iteration as described above.

Then, the cycle of steps (b) to (d) is starting again. Therein, the steps of the claimed method are preferably repeated until the adapted simulated X-ray spectrum converges against the measured X-ray spectrum. The convergence of the adapted simulated X-ray spectrum against the measured X-ray spectrum can be determined in different ways. Exemplarily, a difference between those spectra is determined, e.g., based on numeric values of the spectral lines or based on the images of the measured X-ray spectrum and adapted simulated X-ray spectrum. The iteration of the method steps may then be repeated until the difference becomes smaller than at least one predetermined threshold, wherein different thresholds may be used for different spectral lines. Alternatively, the iteration is repeated until the difference converges, i.e., if a change in the difference becomes smaller than a predetermined threshold. When the iteration is stopped, the adapted sample composition of the last cycle is the resulting determined sample composition for the uncoated sample, wherein the adapted coating thickness is the determined coating thickness on the sample.

In a particularly preferred embodiment of the present invention, in step (b) of the claimed method, the simulated X-ray spectrum is further determined based on an initial coating material and an initial coating thickness. Therein, the simulated X-ray spectrum is first determined as described above based on the initial sample composition and e.g., using equation (3) of the Pouchou publication. In a next step, the so determined X-ray spectrum is corrected for absorption in the coating layer based on the initial coating layer and the initial coating thickness. Therein, the absorption is preferably determined using the Beer-Lambert-Law, which can be written as $$I' = I * \exp\left(-\mu(E) * \rho * \frac{d}{\sin(\varphi)}\right),$$

wherein I is the intensity of a line in the X-ray spectrum without absorption in the coating material and I' is the intensity of the respective line after attenuation by absorption in the coating layer. Further, $\mu$ is the mass attenuation coefficient of the coating material for the energy E of the respective line, $\rho$ is the density of the coating material and d is the thickness of the coating material in the normal direction. Further, $\varphi$ is the emergence angle of the X-ray photons relatively to the sample surface and hence $$\frac{d}{\sin(\varphi)}$$

denotes the path length or the X-ray photons in the coating. Further, the intensity is dependent on the high voltage used for generating and/or accelerating the incident charged particle beam and thus the intensities are usually scaled per unit of the charged particle beam, e.g. $\mu A$. Additionally, an energy loss or the attenuation of the incident charged particles in the coating material can be taken into account; however this influence is rather minor.

In a particularly preferred embodiment of the present disclosure, step (b) of the method thus comprises the following sequence of substeps. In a first substep (b1), at least one characteristic line for each element of the initial sample composition is determined based on an X-ray analysis as described above under reference to the Pouchou publication. Then, in a substep (b2), an attenuation of the characteristic lines is determined by considering the absorption in the initial coating material with the initial coating thickness. In other words, the Beer-Lambert-Law is applied to each of the characteristic lines. The resulting attenuated lines are then determined as the simulated first lines of the simulated X-ray spectrum in a substep (b3) and can thus be used for comparison to the measured first lines. Hence, the simulated X-ray spectrum reflects the sample composition as well as the coating material and the coating thickness and hence yields good comparability with measurements.

In a further particularly preferred embodiment, the step (c) further comprises the following substeps. In a substep (c1) the initial sample composition is varied and the adapted simulated X-ray spectrum is determined based on the varied sample composition. Therein, the adapted simulated X-ray spectrum is preferably determined as already described above. In another substep (c2) the matching of each of the initial simulated X-ray spectrum and the adapted simulated X-ray spectrum with the measured X-ray spectrum is determined and these determined matchings are then compared to each other. Exemplarily, a first difference is determined for the initial simulated X-ray spectrum and the measured X-ray spectrum and a second difference is determined for the adapted simulated X-ray spectrum and the measured X-ray spectrum. Then, the first and the second differences are compared to each other. Based on the comparison, in another substep (c3) it is then determined whether the initial simulated X-ray spectrum or the adapted simulated X-ray spectrum provides a better match with the measured X-ray spectrum. Exemplarily, the better match is determined based on whether the first difference or the second difference is smaller, wherein a smaller difference corresponds to a better match. According to this embodiment, the substeps (c1) to (c3) are then iteratively repeated, wherein the spectrum determined in substep (c3) is used as starting point. In other words, the variation of the sample composition is performed stepwise, wherein for each step it is checked whether the variation improves a match with measurements. The stepwise variations may therein adapt the concentration of individual constituents or of group of constituents. Further, the constituents itself may be adapted, e.g., by change of materials.

In the above embodiment, the substeps (c1) to (c4) thus describe an iterative adaption of the simulated X-ray spectrum by adapting the assumed sample composition while keeping the coating thickness and material constant. The above substeps thus form a subroutine of the iterative method of the disclosure. However, as the coating material and thickness is kept constant a convergence to the measured X-ray spectrum is probably not achieved. Thus, according to this preferred embodiment, the substeps (c1) to (c3) are preferably repeated until a deviation between the simulated X-ray spectrum and the measured X-ray spectrum converges. Hence, the deviation (difference), e.g., determined as least mean squares between the spectra, might not drop under a predefined threshold but the change of this deviation between two subsequent iteration cycles drops below a predetermined threshold.

Further preferred, in above embodiment, the substep (c1) further comprises the following substeps. In a first substep (c11) at least one characteristic line for each element of the varied sample composition is determined, e.g., as described with respect to the Pouchou publication. In a next substep (c12) an attenuation of the characteristic lines is determined by absorption in the initial coating material with the initial coating thickness, e.g., by applying the Beer-Lambert-Law as described above. Finally, in a substep (c13), simulated first lines are determined based on the attenuation of the characteristic lines, i.e., as the attenuated lines. Hence, in this iterative cycle, the initial coating thickness is used for determining absorption.

However, in an alternatively preferred embodiment, the attenuation by the coating material is not considered in the simulated X-ray spectra. On the contrary, the measured X-ray spectrum is corrected for the absorption in the coating material before performing the comparison to the simulated X-ray spectrum in step (c) of the method of the disclosure. In other words, according to a further preferred embodiment in step (c) an intensity of the first lines in the measured X-ray spectrum is increased to compensate for attenuation by absorption in the initial coating material with the initial coating thickness. This might be done e.g., by applying the inverse of the Beer-Lambert-Law as described above. However, this embodiment is less straightforward as the previously described adaption of the simulated spectrum but nevertheless forms a straightforward workaround that falls under the scope of the disclosure.

Step (d) of the method of the present disclosure relates to the determination of an adapted coating thickness based on the adapted sample composition and the at least one second line of the measured X-ray spectrum. Therefore, a functional relationship is required connecting the adapted concentrations, e.g., $c_1, c_2, \ldots, c_n$, of the sample and the measured intensity of the at least one second line ($l_{line2}$) with the thickness d of the coating material, i.e., $d=f(l_{line2}, c_1, c_2, \ldots, c_n)$. As the measured intensity usually depends on the energy of the incident charged particle beam, the measured line intensities are usually scaled per unit of the charged particle beam, e.g. HV in μA, and hence the function becomes $d=f(l_{line2}, HV, c_1, c_2, \ldots, c_n)$.

In a further particularly preferred embodiment of the method, step (d) further comprises the following substeps. In a first substep (d1) a mean atomic number is determined based on the adapted sample composition. Therein, the mean atomic number is preferably determined as the weighted mean of the atomic numbers of constituents of the adapted sample composition, considering the concentrations of the constituents as the weighting factors. The mean atomic number is therein preferably determined as an integer in order to allow for an identification of a corresponding element. In a next substep (d2) a thickness of the coating material is determined based on the determined mean atomic number and the second line of the measured X-ray spectrum. In other words, a thickness of the coating material is determined based on the assumption that the coating material is a thin coating layer on top of a pure element with the mean atomic number. Hence, in step (d2) the second line of the measured X-ray spectrum is associated with the coating material deposited on a pure sample consisting of an element with the determined mean atomic number. That is, a coating thickness is determined that would lead to a second line simulated for the coating material being deposited on a sample of a pure element with the determined mean atomic number. This determination can be carried out in several ways.

According to a preferred embodiment, the determination is based on a functional relationship connecting the intensity of a characteristic (second) line of a specific coating material with the mean atomic number of the bulk sample to which the coating is applied as well as to a thickness of the coating material. Such functional relationship can be determined based on the above considerations connected to the simulation of X-ray spectra based on an assumed sample composition as well as on absorption effects in the coating. Further, for the functional relationship the emission of X-rays in the coating itself have to be considered as well as interactions with the samples, such as e.g., due to overlying spectral lines of the bulk sample and the coating, or resonance energy transfer, or the like. Further, in the functional relationship the excitation voltage, current for the incident charged particle beam has to be considered. Thus, the intensity is usually scaled per unit of excitation current (μA, nA, . . . ). The functional relationship may further depend on a take off angle of the X-ray detector.

According to another preferred embodiment, the above determination is based on at least one look-up-table, LUT, that connects for a specific coating material, the expected intensity of a characteristic (second) line with the material (i.e., atomic number) of an underlying pure element bulk sample as well as with a thickness of the coating on such pure element sample. Such LUTs can be determined by conducting a plurality of measurement series for a variety of coating materials as well as for a variety of pure element bulk samples. Again therein, the intensity of the characteristic line is usually determined as counts per second per Ampere. Further, performing at least some of those measurement series further allows for finding a fitted functional relationship using the determined measured values as support bases. Thus, multidimensional fitted functions connecting expected intensity of a coating material for different thicknesses and different atomic number of the sample material can be derived. Further preferred, a functional relationship derived based on analytic consideration is preferably considered by determining the functional form of a fitted functional relationship.

In a further preferred embodiment, step (a) of the claimed method further comprises the following substeps. In a first substep (a1) the measured X-ray spectra is preferably compared with a database comprising the X-ray spectra for a plurality of insulating materials. Based on the comparison a best matching X-ray spectrum is determined out of the X-ray spectra in the database. Such databases are available to the person skilled in the art and usually come with the possibilities to adapt the stored X-ray spectra to the measurement conditions of the measured X-ray spectrum, e.g., by accounting for the excitation voltage or current or the like. In this preferred embodiment, one or more candidate X-ray spectra are selected from the database and preferably presented to a user for confirmation. Hence, false positives can be excluded based on a priori knowledge of the skilled person. In determining the best matching X-ray spectrum out of the database covering insulating materials the possibility of a coating on the sample is considered, e.g., in determining a better match for first X-ray spectrum covering only a portion of characteristic lines of the measured X-ray spectrum than for a second X-ray spectrum covering all lines of the measured X-ray but with less concordance than the first X-ray spectrum. Hence, only a partial match of the spectra might be sufficient for matching.

In this embodiment, the step (a) of the claimed method further comprises the substep (a2) of identifying the plurality of first lines in the measured X-ray spectrum based on the X-ray spectrum of the best matching insulating material. In other words, if a matching X-ray spectrum of an insulating material is found in the database, a plurality of first lines in the detected X-ray spectrum corresponding to this insulating material are identified in the measured X-ray spectrum. Hence, in step (a2) it is actually determined that the sample itself is an insulating material and hence comprises a coating with high probability. Additionally or alternatively in step (a2) further an initial sample composition is determined based on the best matching insulating material. That is, in step (a2) the plurality of first lines and/or the initial sample composition is/are determined before being utilized in the subsequent method steps.

In substep (a3) of this preferred embodiment at least one second line in the measured X-ray spectrum is identified as a residual line that is not fitting the X-ray spectrum of the best matching insulating material. In other words, the coating material can be identified in a differential approach by first identifying the insulating material. Further preferred, the coating material is identified on the position, and eventually the amplitude, of the at least one second line. Additionally and/or alternatively in step (a3) an initial coating material is determined based on the residual line. That is, in step (a3) the at least one second line and/or the initial coating composition, and eventually coating thickness, are thus identified in the measured X-ray spectrum before being utilized in the subsequent steps of the claimed method. Alternatively, an initial coating thickness is based on a measured thickness value, a set value of a coating process or merely on a reasonable assumption (educated guess) of a user.

The steps and substeps of the claimed method as described above, except those described explicitly as hardware, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g. on a PCB or another kind of circuit carrier. The conducting elements may comprise metallization, e.g. surface metallization and/or pins, and/or may comprise conductive polymers or ceramics. Further electrical energy might be transmitted via at least one wireless connection.

Further, the various steps or substeps of the method may be a process or thread, running on one or more processors, in one or more computing devices, executing computer program instructions and interacting with other system components for performing the various described functionalities. The computer program instructions are stored in a memory which may be implemented in a computing device using a standard memory device, such as, for example, a random access memory. The computer program instructions may also be stored in other non-transitory computer readable media such as for example a flash drive, or the like.

Also, a person of skill in the art should recognize that the functionality of various computing devices may be combined or integrated into a single computing device, or the functionality of a particular computing device may be distributed across one or more other computing devices without departing from the scope of the exemplary embodiments of the disclosure.

Another aspect of the present disclosure is directed to a measurement system, comprising an electron microscope, EM, preferably a scanning electron microscope or a transmission electron microscope. The electron microscope comprises an electron beam source. The measurement system further comprises an X-ray detector, preferably an energy-dispersive X-ray detector and/or a detector setup suitable for performing WDS measurements. The measurement system of the disclosure further comprises a control unit that is configured to perform the steps of the claimed methods as described above, partially by controlling the further components of the measurement system to perform respective steps or by performing respective steps itself. Preferably, the control unit further has access to a storage comprising a database with X-ray spectra of a plurality of insulating material and/or information on a functional relationship between the intensity of at least one characteristic (second) line of a coating material (preferably intensity per unit of beam current [cps/μA]), the coating thickness and the material of the pure element bulk sample carrying the coating. Such information may comprise look-up-tables, LUT, fitted functional relationships derived from such LUTs and/or functional relationships in an analytic form. Such functional relationship is preferably stored in the database for one coating material or a plurality of coating material.

Another aspect of the present disclosure is directed to a computer program comprising instructions which, when the program is executed by a computer, preferably by the control unit of the measurement system according to the present disclosure, cause the computer, preferably by the control unit of the measurement system according to the present disclosure, to carry out the steps and substeps of the method of the present disclosure described above, particularly the steps of: (a) Obtaining a measured X-ray spectrum for the coated sample, the measured X-ray spectrum comprising a plurality of first lines characteristic for the sample and at least one second line characteristic for a coating material; (b) Determining a simulated X-ray spectrum for the sample based on an initial sample composition; (c) Determining an adapted sample composition that improves a match between the plurality of first lines and an adapted simulated X ray spectrum; (d) Determining an adapted coating thickness for the coating material based on the adapted sample composition and the at least one second line; (e) Repeat the steps (b) to (d) using the adapted sample composition and the adapted coating thickness of the coating material instead of the initial values, wherein the coating thickness is used for determining an absorption of X-rays. Another aspect of the present disclosure relates to a computer-readable data carrier having stored thereon a computer program for carrying out the method according to the present disclosure as described above.

Further aspects and preferred embodiments of the present disclosure result from the dependent claims, the drawings and the following description of the drawings. Different disclosed embodiments are advantageously combined with each other if not stated otherwise.

BRIEF DESCRIPTION OF THE DRAWINGS

The features of the invention become apparent to those skilled in the art by the detailed description of exemplary embodiments with reference to the attached drawings in which.

DETAILED DESCRIPTION OF THE DRAWINGS

Figure 1:
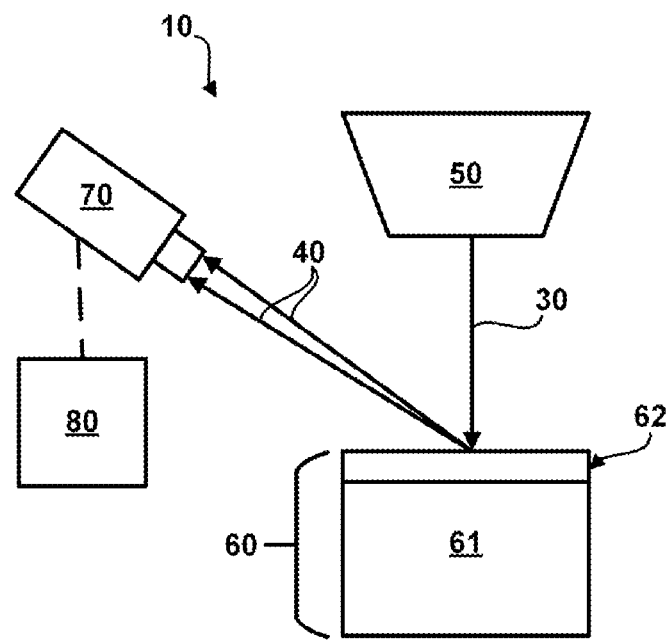
FIG. 1 schematically illustrates a measurement system according to an embodiment.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present invention, however, may be embodied in various different forms, and should not be construed as being limited to only the illustrated embodiments herein. Rather, these embodiments are provided as examples so that this disclosure will be thorough and complete, and will fully convey aspects of the invention.

Accordingly, processes, elements, and techniques that are not considered necessary to those having ordinary skill in the art for a complete understanding of the aspects and features of the present disclosure may not be described. As used herein, the term "and/or" includes any and all combinations of one or more of the associated listed items. Further, the use of "may" when describing embodiments of the present disclosure refers to "one or more embodiments of the present invention." In the following description further the terms of a singular form may include plural forms unless the context clearly indicates otherwise. It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. Expressions such as "at least one of," when preceding a list of elements, modify the entire list of elements and do not modify the individual elements thereof.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed as numeric value, the term "substantially" denotes a range of +/−5%.

FIG. 1 schematically illustrates a measurement system according to an embodiment of the present disclosure, the measurement system comprising an electron microscope 10 with a electron beam source 50 usually comprising an electron source for generating electrons and a beam forming unit with e.g., a polepiece, for generating a focused beam of electrons 30. The electron beam 30 is incident on a sample 60 comprising a bulk sample 61 consisting of an insulating material and further comprising a conductive coating 62 applied on a top surface of the bulk sample 61. The electron beam 30 is incident on the top surface, i.e., coating 62. In response to be hit by the high energy electrons, the sample 60, i.e., the insulating bulk sample 61 as well as the inductive coating 61 emit characteristic X-rays 40. These X-rays 40 are detected by an X-ray detector 70 that is configured to resolve the amount of X-rays of different energies (energy-dispersive X-ray detector). The detector 70 is connected to a control unit 80 that is configured to perform the method of the present disclosure. The control unit 80 may further be connected to other parts of the electron microscope, e.g., the beam source 50. The control unit 80 is configured to perform the steps as explained in the following.

Figure 2:
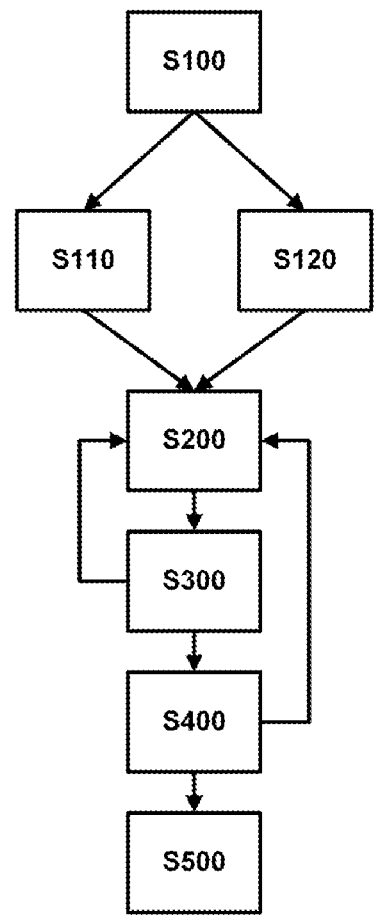
FIG. 2 illustrates a sequence diagram of a method according to an embodiment.
Figure 4:
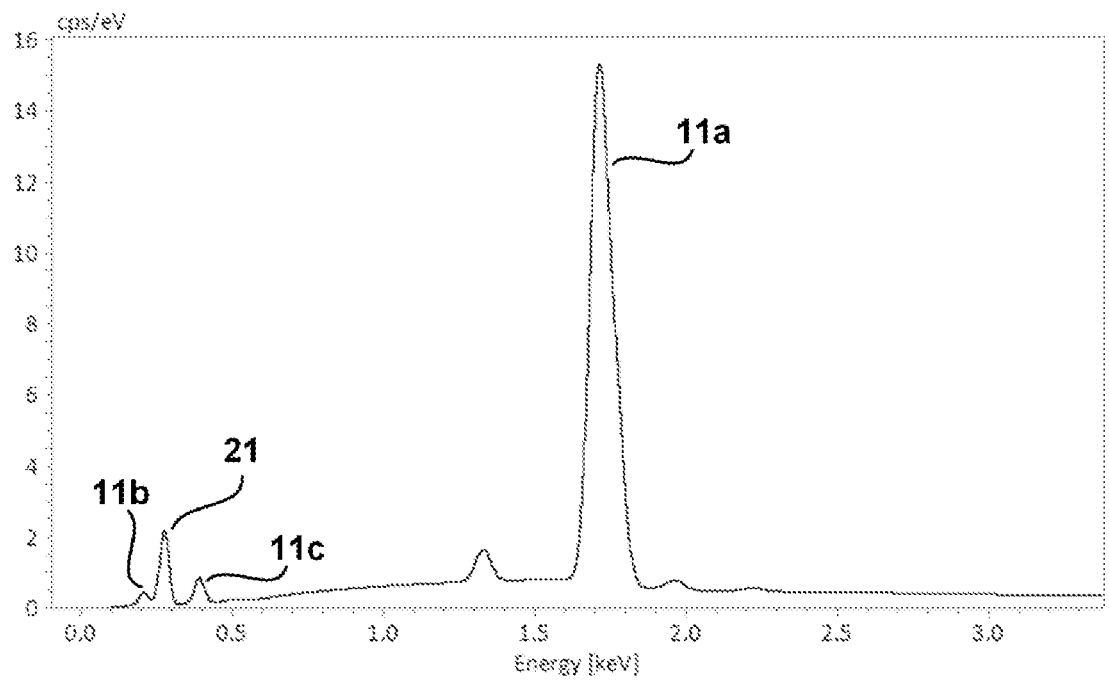
FIG. 4 illustrates a measured X-ray diagram for a coated sample used in the method.

FIG. 2 illustrates a sequence diagram of a method according to an embodiment, the steps of which shall be described with respect to the measured X-ray diagram as of FIG. 4, which illustrates a measured X-ray diagram for a coated sample 60 used in the method of FIG. 2.

In a first step S100, a measured X-ray spectrum for a coated sample 60 is obtained as shown in FIG. 4. As an a priori measurement it is known that the coated sample comprises a bulk part 61 with tantalum and nitrogen, each with unknown concentration. It is further known that the sample 60 has a coating layer 62 of carbon with an unknown coating thickness. Hence, the measured X-ray spectrum comprises a plurality of first lines 11a, 11b, 11c characteristic for the sample 61 and at least one second line 21 characteristic for the coating material 62. Particularly, the first lines 11a and 11b are characteristic X-ray lines for tantalum and the first line 11c is a characteristic line for nitrogen. The second line 21 is characteristic for carbon.

Based on the measured X-ray spectrum and/or a user's a priori knowledge in step 110 an initial sample composition with a concentration of 50 wt % tantalum and a concentration of 50 wt % is assumed for the TaN bulk sample 61 and in step 120 an initial coating thickness of 30 nm is assumed for the initial coating composition consisting of carbon. Based on these assumptions a simulated X-ray spectrum is determined for the sample 60, i.e., the bulk sample 61 and the coating 62, in step S200. The simulated X-ray spectrum is determined by simulating the position and intensities of characteristic X-ray lines based on the initial sample composition and by attenuating the calculated characteristic lines by considering the absorption of the X-ray lines in the carbon coating of 30 nm thickness.

In step S300, the initial sample composition is adapted in order to improve a match between the plurality of first lines 11a, 11b, 11c in the measured spectrum and corresponding lines of an adapted simulated X-ray spectrum based on the adapted sample composition. These first iteration loop of the steps S200 and S300 is repeated until a deviation between the measured X-ray spectrum and the adapted simulated X-ray spectrum converges, i.e., until the match is not getting any better. During this first iteration round the initial coating thickness of 30 nm is constantly used for calculating the attenuation of the characteristic lines in the coating 62. The adapted sample composition providing a better match between the simulated X-ray spectrum and the measured X-ray spectrum comprises 92 wt % of Ta and 7 wt % of N.

In a next step S400 an adapted coating thickness for the coating material 62 is determined based on the adapted sample composition determined in step S300 and based on the at least one second line 21 of the measured X-ray spectrum. Starting from the initial sample composition with an assumed concentration for both of the pure elements Ta and N of c=50 wt %, a mean atomic number of the bulk sample 61 would be $\overline{Z}=\Sigma c_i Z_i$ of $\overline{Z}=40$ corresponding to a bulk sample of pure Zirconium. The peak intensity of the second line 21 in the measured sample is about 34000 cps/μA, which already for the mean atomic number of $\overline{Z}=40$ would amount to a coating thickness of carbon of about 22 nm. This value of the coating thickness of carbon is derived from a LUT comprising the peak intensities of carbon coatings of different thickness on bulk samples of different pure element materials. Further, for the adapted sample composition one gets a mean atomic number $\overline{Z}=68$ corresponding to a bulk sample of pure Erbium. Alternatively, also a material with a similar mean atomic number, e.g., Tm with $\overline{Z}=69$, could be used without deviating from the claimed method. Again based on the LUT, a carbon coating thickness of approximately 29 nm is determined for the second line intensity of 34000 cps/μA and considering a pure Er bulk sample 61. Hence, the adapted coating thickness determined in step S400 of the method illustrated in FIG. 2 is 29 nm. With these adapted coating thickness the steps S200 and S300 are repeated in the first iteration loop, again until the deviation between the adapted simulated X-ray spectrum based on the adapted coating thickness and the measured X-ray spectrum converges, i.e., the match does not get better. Then, step S400 is again performed in a second iteration loop for again updating the coating thickness based on the mean atomic number of the freshly adapted sample composition determined in the last repetition of step S300. Then the second iteration loop goes back to step S200 based on the updated coating thickness determined in step S400. These iteration loops, i.e., steps S200 to S400 are repeated until the adapted simulated X-ray spectrum converges against the measured X-ray spectrum in step S500, as a deviation between these X-ray spectra drops below a predetermined threshold or does not change anymore. The adapted sample composition and the adapted coating thickness determined in the very last repetitions of the steps S300 and S400, respectively, are then output as final values.

Figure 3:
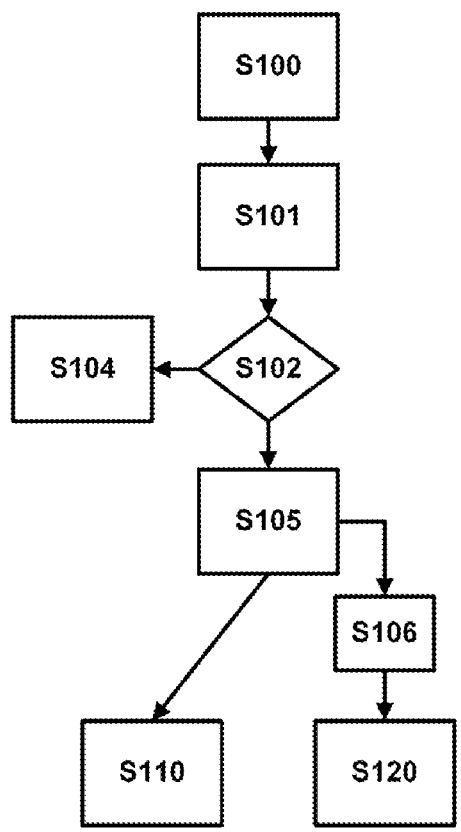
FIG. 3 illustrates a sequence diagram of a method according to a preferred embodiment.

FIG. 3 illustrates a sequence diagram of a method according to a preferred embodiment of the disclosure, particularly to a preferred embodiment of the initial steps of the method. Therein, in step S100 again a measured X-ray spectrum as of FIG. 4 is obtained.

In step S101 then an initial qualitative analysis is performed for all the characteristic lines of the measured spectrum by comparing the measured spectrum with a database comprising X-ray spectra of a plurality of insulating materials. This comparison results in identifying the lines 11a and 11b with tantalum, the line 11c with nitrogen and the line 12 with carbon.

In step S102, then a comparison is performed if the found qualitative analysis yields a possible insulating material that could form the bulk sample 61 of the sample 60. If no insulating material could be found in step S102, e.g., if all lines correspond to conducting materials, then the method is aborted in step S104. However, if an insulating material can be identified fitting at least part of the characteristic lines of the measured spectrum, then the method proceeds to step S105. In this step S105, the bulk sample composition 61 is determined to be TaN and the insulating material determined in this step is set as the initial material composition used in step S110 of the method of FIG. 2 as explained before.

Further, based on the residual line 21 of the measured X-ray spectrum which is not matching the insulating TaN material carbon is determined as the coating material 62 in step S105. Further, a user is prompted to input an initial coating thickness for the carbon coating in step S106 and the input value is set as the value of the initial coating thickness of step S120 of the method of FIG. 2 as already explained before and carbon is set as the initial coating composition of step S120 of the method of FIG. 2 as already explained before. Alternatively, also the initial coating thickness may be approximated by an algorithm, wherein the user is nevertheless prompted to confirm the automatic approximation with a user input.

The method then proceeds as already explained with respect to FIG. 2 except that an a priori knowledge of the user is not longer required for setting the initial sample composition, for setting the initial coating composition and for setting the initial coating thickness.

REFERENCE SIGNS 10 electron microscope EM
11 first lines of measured X-ray spectrum
21 second lines of measured X-ray spectrum
30 electron beam 30
40 characteristic X-rays
60 sample
61 bulk sample
62 sample coating
70 X-ray detector
80 control unit

The invention claimed is:
1. Method for determining a sample composition, the method comprising the steps of:
   (a) Obtaining a measured X-ray spectrum for a coated sample, the measured X-ray spectrum comprising a plurality of first lines characteristic for the sample and at least one second line characteristic for a coating material;

(b) Determining a simulated X-ray spectrum for the sample based on an initial sample composition;

(c) Determining an adapted sample composition that improves a match between the plurality of first lines and an adapted simulated X-ray spectrum;

(d) Determining an adapted coating thickness for the coating material based on the adapted sample composition and the at least one second line; and (e) Repeating the steps (b) to (d) using the adapted sample composition instead of the initial sample composition and using the adapted coating thickness of the coating material, wherein the coating thickness is used for determining an absorption of X-rays.

2. Method according to claim 1, wherein the steps (b) to (d) are repeated until the adapted simulated X-ray spectrum converges against the measured X-ray spectrum.

3. Method according to claim 1, wherein in step (b) the simulated X-ray spectrum is further determined based on an initial coating material and an initial coating thickness.

4. Method according to claim 3, wherein step (b) further comprises the steps of:
(b1) Determining at least one simulated characteristic line for each element of the initial sample composition;
(b2) Determining an attenuation of the simulated characteristic lines by absorption in the initial coating material with the initial coating thickness; and
(b3) Determining simulated first lines based on attenuating the simulated characteristic lines.

5. Method according to claim 3, wherein in step (c) an intensity of the first lines in the measured X-ray spectrum is increased to compensate for attenuation by absorption in the initial coating material with the initial coating thickness.

6. Method according to claim 1, wherein step (c) further comprises the steps of:
(c1) Varying the initial sample composition and determining the adapted simulated X-ray spectrum based on the varied sample composition;
(c2) Comparing the matching of each of the simulated X-ray spectrum and the adapted simulated X-ray spectrum with the measured X-ray spectrum;
(c3) Determining whether the simulated X-ray spectrum or the adapted simulated X-ray spectrum provides a better match with the measured X-ray spectrum;
(c4) Repeating steps (c1) to (c3) with that spectrum determined in step (c3) as to provide a better match with the measured X-ray spectrum.

7. Method according to claim 6, wherein the steps (c1) to (c3) are repeated until a deviation between the simulated X-ray spectrum and the measured X-ray spectrum converges.

8. Method according to claim 6, wherein in step (b) the simulated X-ray spectrum is further determined based on an initial coating material and an initial coating thickness and wherein step (c1) further comprises the steps of:
(c11) Determining at least one characteristic line for each element of the varied sample composition;
(c12) Determining an attenuation of the characteristic lines by absorption in the initial coating material with the initial coating thickness; and
(c13) Determining simulated first lines based on attenuating the characteristic lines.

9. Method according to claim 1, wherein step (d) further comprises the steps of:
(d1) Determining a mean atomic number based on the adapted sample composition; and
(d2) Determining a thickness of the coating material based on the mean atomic number and the second line of the measured X-ray spectrum.

10. Method according to claim 9, wherein in step (d2) the second line of the measured X-ray spectrum is associated with the coating material deposited on a pure sample consisting of an element with the mean atomic number.

11. Method according to claim 1, wherein step (a) further comprises the steps of:
(a1) Comparing the measured X-ray spectra with a database comprising the X-ray spectra for a plurality of insulating materials and determining a best match;
(a2) Identifying the plurality of first lines in the measured X-ray spectrum based on the X-ray spectrum of the best matching insulating material; and
(a3) Identifying the at least one second line in the measured X-ray spectrum as a residual line not fitting the X-ray spectrum of the best matching insulating material.

12. Method according to claim 11, wherein in step (a2) further an initial sample composition is determined based on the best matching insulating material and/or wherein in step (a3) an initial coating material is determined based on the residual line.

13. Measurement system, comprising an electron microscope, EM, (10) with an electron beam source (50), an X-ray detector (70), and a control unit (80) configured to perform the method determining a sample composition according to claim 1.

14. Computer program comprising instructions which, when the program is executed by a control unit of a measurement system comprising an electron microscope, EM, (10) with an electron beam source (50), an X-ray detector (70), and a control unit (80) configured to perform a method for determining a sample composition will carry out the method of claim 1.

* * * * *